(12) United States Patent
Sobel et al.

(10) Patent No.: US 7,941,443 B1
(45) Date of Patent: May 10, 2011

(54) EXTENDING USER ACCOUNT CONTROL TO GROUPS AND MULTIPLE COMPUTERS

(75) Inventors: William E. Sobel, Jamul, CA (US); Brian Hernacki, Mountain View, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 610 days.

(21) Appl. No.: 12/124,979

(22) Filed: May 21, 2008

(51) Int. Cl.
G06F 7/00 (2006.01)
G06F 17/30 (2006.01)
(52) U.S. Cl. .................. 707/781; 707/802; 709/206
(58) Field of Classification Search .................. None
See application file for complete search history.

(56) References Cited

U.S. PATENT DOCUMENTS

| | | | | |
|---|---|---|---|---|
| 6,466,932 B1* | 10/2002 | Dennis et al. | .................. | 710/33 |
| 6,466,969 B1* | 10/2002 | Bunney et al. | ................ | 709/206 |
| 6,992,991 B2* | 1/2006 | Duske et al. | .................. | 370/316 |
| 7,133,834 B1* | 11/2006 | Abelow | ........................ | 705/10 |
| 7,149,738 B2* | 12/2006 | Kumar et al. | ................ | 707/694 |
| 7,321,883 B1* | 1/2008 | Freedy et al. | .................... | 706/45 |
| 7,350,204 B2* | 3/2008 | Lambert et al. | ............... | 717/172 |
| 2002/0069056 A1* | 6/2002 | Nofsinger | .................... | 704/235 |
| 2002/0099952 A1* | 7/2002 | Lambert et al. | ............... | 713/200 |
| 2002/0161602 A1* | 10/2002 | Dougherty et al. | .............. | 705/1 |
| 2003/0101247 A1* | 5/2003 | Kumbalimutt et al. | ....... | 709/221 |
| 2003/0217142 A1* | 11/2003 | Bobde et al. | ................. | 709/224 |
| 2004/0068545 A1* | 4/2004 | Daniell et al. | ................ | 709/206 |
| 2004/0210767 A1* | 10/2004 | Sinclair et al. | ................ | 713/201 |
| 2005/0100211 A1* | 5/2005 | Gibson et al. | ................. | 382/162 |
| 2005/0251748 A1* | 11/2005 | Gusmorino et al. | .......... | 715/713 |
| 2006/0008789 A1* | 1/2006 | Gerteis | ........................ | 434/365 |
| 2006/0010373 A1* | 1/2006 | Burns | .......................... | 715/513 |
| 2006/0064486 A1* | 3/2006 | Baron et al. | .................. | 709/224 |
| 2006/0143685 A1* | 6/2006 | Vasishth et al. | ................... | 726/1 |
| 2006/0259499 A1* | 11/2006 | Moulckers et al. | ........... | 707/100 |
| 2007/0128899 A1* | 6/2007 | Mayer | .......................... | 439/152 |
| 2007/0266124 A1* | 11/2007 | Kinyon et al. | ................ | 709/221 |
| 2007/0276862 A1* | 11/2007 | Toutonghi | ................. | 707/103 X |
| 2008/0123626 A1* | 5/2008 | Yin | .............................. | 370/352 |
| 2008/0155472 A1* | 6/2008 | Runge et al. | .................. | 715/811 |
| 2010/0149558 A1* | 6/2010 | Bostick et al. | ................. | 358/1.9 |
| 2010/0274812 A1* | 10/2010 | Moses et al. | ................... | 707/783 |

OTHER PUBLICATIONS

Dirk Mahling et al., From Office Automation to Intelligent Workflow Systems, Jun. 1995, IEEE, 10 Issue: 3, pp. 41-47.*
Richard Atterer et al., Knowing the user's every move: User Activity Tracking For Website Usability evaluation and inplicit interaction, 2006, ACM, May 23-26, pp. 203-212.*

* cited by examiner

Primary Examiner — Pierre M Vital
Assistant Examiner — Taelor Kim
(74) Attorney, Agent, or Firm — Brill Law Office; Jeffrey Brill

(57) ABSTRACT

User account control (such as the UAC component of Windows Vista) is extended to enable users to allow their decisions on how to respond to managed events to be applied to equivalent events for groups, without any further prompting. When a managed event first occurs, the user is presented with an extended dialog prompting for input not only on whether to allow the event for just the user, but also on whether to allow the event for any groups the user manages. Managed groups can comprise all of the user's computers, or multiple user accounts the user manages. The user's response to the prompt and information concerning the managed event are stored. Matching events within a group context are recognized, and appropriate stored responses are automatically applied, without any additional user prompting.

12 Claims, 2 Drawing Sheets

EXTENDING USER ACCOUNT CONTROL TO GROUPS AND MULTIPLE COMPUTERS

TECHNICAL FIELD

This invention pertains generally to computer operating environments, and more specifically to extending operating system user account control mechanisms to multiple users and multiple computers, to provide a more seamless user experience.

BACKGROUND

Mechanisms to control individual user accounts are becoming a more common feature in multi-user operating systems. For example, User Account Control ("UAC") is a new security component in Windows Vista®. UAC enables lower privileged "standard users" to perform administrative actions in Vista® without having to log off and log back on as an administrator, switch between user accounts, or use the Run As feature. (A "standard user" account is synonymous with a user account in Windows XP®.) In Vista®, any user who is a member of the local Administrators group can run most applications as a standard user. When attempting to perform an administrative action, the user is provided with a consent dialog, prompting them to indicate whether or not they want the action to proceed. (A user who is not already authenticated as an administrator is presented with an authentication dialog, requiring the user to provide administrative credentials to continue.)

Users are typically presented with such dialogs when attempting to install new software, or make system changes. This frequent prompting has led to complaints that the feature is too invasive, and at the same time too hard for end users to understand. For sophisticated users who know what actions are and are not safe to perform, the constant popping-up of dialogs is an unproductive inconvenience. For users who do not know what actions are safe to perform, the dialogs are not only annoying but confusing as well. Prompting users to indicate whether or not they would like to proceed with an action is not helpful for users who do not know what the affects of the action would be.

This problem is compounded in the case in which a single user manages a plurality of other users and/or uses or manages multiple computer systems. Currently UAC responds to specific events by providing an individual user with a Yes/No confirmation prompt. The user's response is only applied for that user on that machine. Even where the same user manages multiple machines, the same prompt appears on each separate machine in response to the event. Where the user manages multiple users on one or more machine(s), the same prompt is repeated for each user in response to the event, even in the case of multiple users of the same machine. Considering the large number of events for which these prompts appear, this results in a great deal of annoying dialog pop-ups, which in many cases are not even helpful or clear to the end user. It would be desirable to provide relief for this problem.

SUMMARY

User account control (such as the UAC component of Windows Vista) is extended to enable users to allow their decisions on how to respond to managed events to be applied to equivalent events for groups, without any further prompting. When a managed event first occurs, the user is presented with an extended dialog prompting for input not only on whether to allow the event for just the user, but also on whether to allow the event for any groups the user manages. Managed groups can comprise all of the user's computers (e.g., a desktop and laptop), or multiple user accounts the user manages on the current and/or other computer(s). The user's response to the prompt and information concerning the managed event are stored. Matching events within a group context are recognized, and appropriate stored responses are automatically applied, without any additional user prompting.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
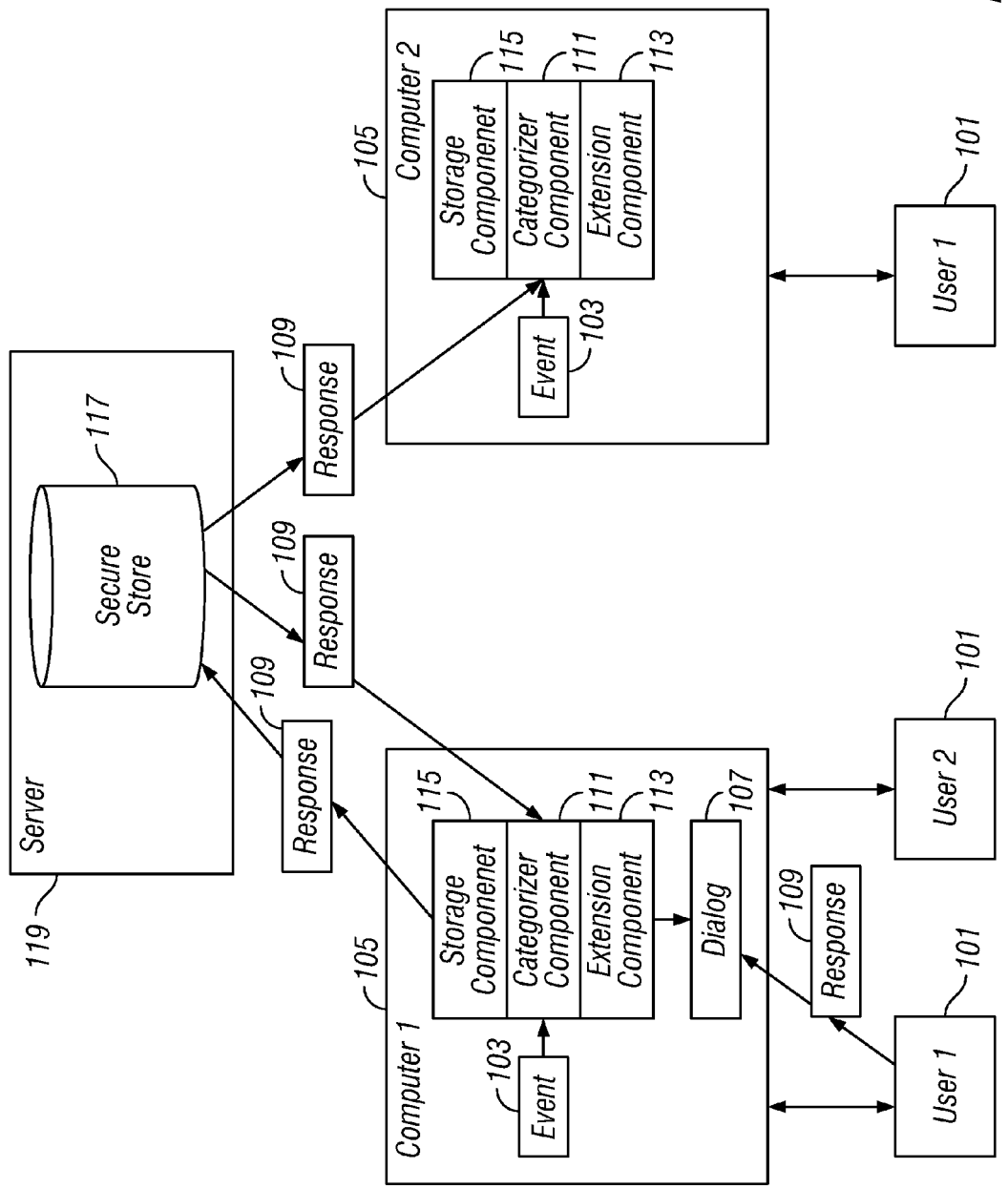
FIG. 1 is a block diagram illustrating a system for extending user account control to groups, according to some embodiment of the present invention.

FIG. 1 illustrates a system for extending user account control to groups, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

According to various embodiments of the present invention, UAC (and similar user control functionality in other operating systems) is extended to enable a user 101 to indicate not only whether to allow a managed action 103 to proceed or not, but also whether to allow equivalent actions 103 without further prompting on all computers 105 s/he uses (e.g., user's desktop and laptop), on all computers 105 s/he manages and/or for all users 101 s/he Manages. As explained in detail below, when an event 103 generates a UAC type dialog 107, the extension functionality stores the response 109 to the prompt 107, and takes a fingerprint of the generating event 103. When a matching event 103 occurs in a covered scenario (e.g., in the case of another computer 105 or user 101 under the user's jurisdiction as per the response 109 to the prompt 107), the stored response 109 is automatically applied, without any additional user 101 prompting.

More specifically, as illustrated in FIG. 1, a categorizer component 111 categorizes UAC events 103 as they occur, and thus can recognize the occurrence of equivalent events 103. An extension component 113 displays extended dialogs 107 where appropriate, in response 109 to the occurrence of events 103 for which a relevant response 109 has not been stored. The extended dialogs 107 display the applicable additional options to the user 101, and accepts his/her response 109. The extension component 113 can be in the form of a direct replacement for the standard executable image that provides this part of the user account control functionality (i.e., consent.exe in the case of Vista®). This component 113 can also comprise a file system redirection driver that redirects requests for the standard executable (e.g., consent.exe) to a second executable instantiating the extended functionality. Either way, a storage component 115 securely stores indications of the categorized prompt 107 generating events 103 and the user 101 entered responses 109 in a secure store 117. The secure store 117 can be located remotely (e.g., on a server 119 managed by the provider of the extended UAC functionality as illustrated, or locally on the user's computer 105, in a way that can be shared with others users 101 and machines 105).

When a UAC type event 103 occurs, the categorizer component 111 determines whether the event 103 is one that is to be recognized across multiple occurrences. For example, an attempt to format the primary hard drive would likely not be remembered, as it would not occur often, nor would it be desirable to allow it to proceed without confirmation each time. On the other hand, installing a specific printer driver likely would be remembered, as it is likely that this type of event 103 would reoccur in the context of other users 101/machines 105, and that the same response 109 would apply. It is to be understood that the specific criteria to use to determine which types of events 103 and which specific events 103 to recognize across multiple occurrences is a variable design parameter.

In response to an event 103 that is not to recognized across multiple occurrences, a standard dialog 107 is presented to the user 101 without any extended options, and the user's response 109 is not stored for future use. On the other hand, when an event 103 to be recognized over time occurs, the categorizer component 111 checks the secure store 117 to see if a resolution for this particular event 103 under the present circumstances exists. If it does, the stored choice is executed. In some embodiments, a prompt 107 with the stored choice selected as a default is displayed instead, in which the user's entered choice is executed.

If a resolution to the event 103 is not already stored, the categorizer component 111 determines what management options the current user 101 has enabled, if any. For example, a user 101 can be configured as managing other users 101 on the computer 105 and/or on other specific computer(s) 105, and/or as managing him or herself on other computer(s) 105. In other words, the categorizer component 111 identifies any groups the user 101 manages. It is to be understood that the above examples of managed groups are not exhaustive, and, particularly in the case of a large enterprise, groups of users 101 and/or computers 105 can be defined in many ways. Based on the management options of the current user 101, an appropriate dialog 107 is presented, providing the user 101 to chose a standard or, where applicable, extended option for responding to the event 103. How specifically to word the choices for the extended options is a variable design parameter. The user's entered choice is executed, and the storage component 115 stores appropriate response 109 information in the secure store 117 for later use.

Some specific usage examples are provided to illuminate under what circumstances this extension functionality could be useful. In a first hypothetical scenario, suppose parents (Mom and Dad) manage the Windows sessions of their two children (Brother and Sister). The shared family computer 105 has separate accounts for each family member. Brother and Sister are young children, so Vista's parental controls are enabled for their accounts. Sister browses to www.britannica.com, which she needs to access for a school project. Since parental controls are enabled, a UAC pop-up is evoked, and one of the administrative users 101 (Mom or Dad) must enter their credentials to allow Sister to access the site. Suppose that Mom not only wishes to allow Sister to access the site, but also realizes that Brother is likely to need access to this site for school as well. Mom can enable this, by selecting the "Allow for All Users I Manage" extended option. Selecting this option stores the response 109, and applies it automatically without further prompting if Brother later attempts to access this site. On the other hand, if Mom wanted to give only Sister access to the site, she could select "Allow for Just this User", and the access privilege would not be extended to Brother.

For another example, suppose an individual has a desktop and a laptop, and is in charge of managing both. This user 101 purchases a new printer, and installs it on his home network. When the user 101 installs the printer driver on the desktop, he receives a UAC prompt 107. The user 101 chooses the extended option "Allow for All Computers I Manage", which will save the response 109 and apply it when the user 101 installs the driver on the laptop. Under standard UAC functionality, the user 101 would be prompted again for consent when installing the same driver on his laptop.

Under a third scenario, suppose a user 101 is the technology leader of her family and manages all user 101 accounts on all computers 105 on their home network (e.g., by using a system such as Norton Oxygen). In the example, this managing user 101 tries out a new software package which she thinks other members of the managed group (typically other family members) would enjoy. When installing the software, the user 101 receives an extended dialog 107 and chooses "Allow for All Users I Manage", in which she can make the software available to the rest of the group without additional prompting. Of course, she could also select "Allow for Just This User" if she does not wish other family members to be able to install a given software package.

Figure 2:
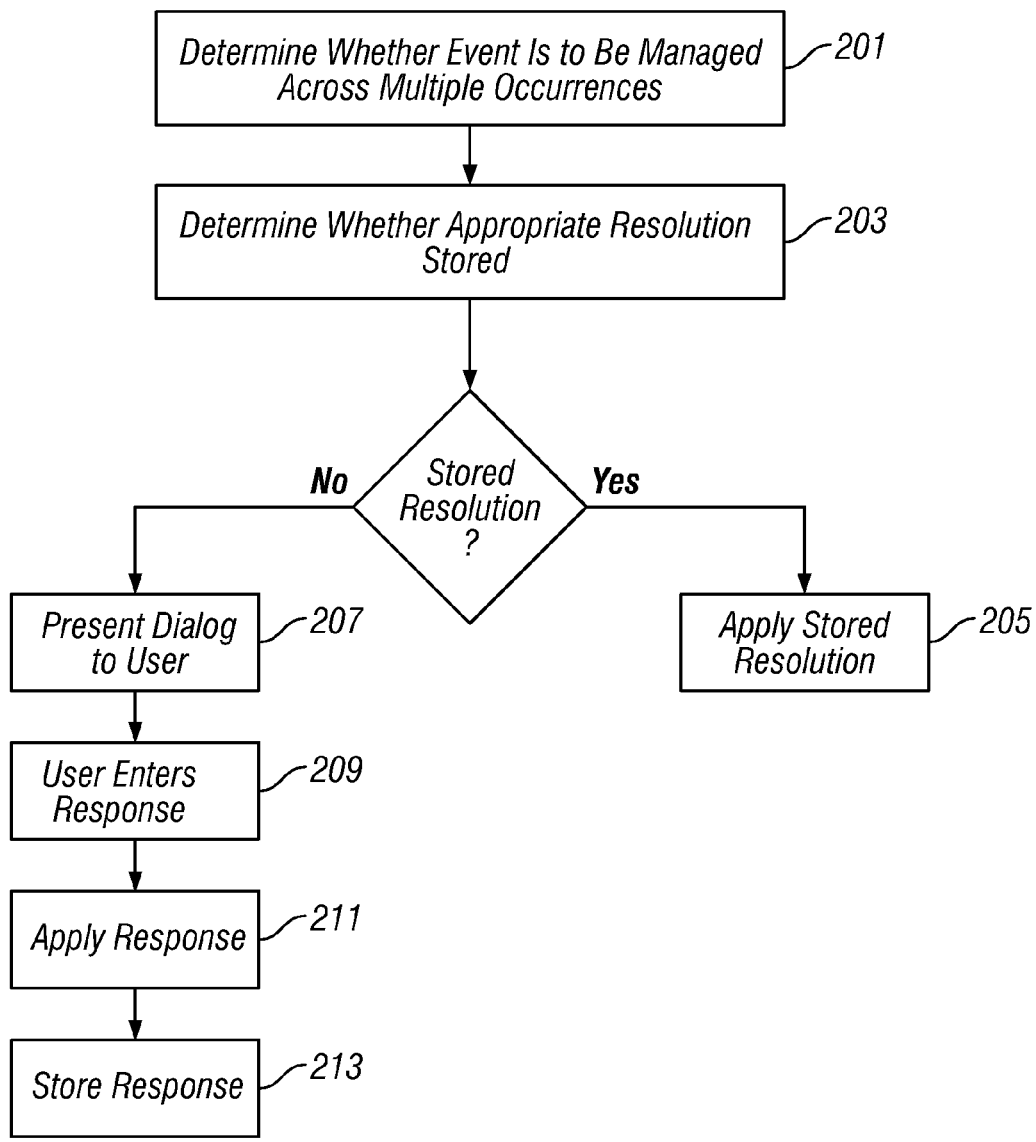
FIG. 2 is a flowchart illustrating steps for extending user account control to groups, according to some embodiment of the present invention.

FIG. 2 illustrates steps for extending UAC like functionality to groups, according to some embodiments of the present invention. A user 101 triggers a managed event 103, in response to which the categorizer component 111 determines 201 whether the event 103 is one to be managed across multiple occurrences. If not, standard processing proceeds (not illustrated). However, if the event 103 is one to be recognized over time, the categorizer component 111 determines 203 whether an appropriate resolution is present in the secure store 117. If so, the stored resolution is applied 205. If not, an appropriate dialog 107 is presented 207 to the user 101, prompting the user 101 to chose a standard or, where applicable, extended option for responding to the event 103. The user 101 then enters 209 a response 109 to the dialog 107, which is applied 211 and stored 213 for later use.

As will be understood by those familiar with the art, the invention may be embodied in other specific forms without departing from the spirit or essential characteristics thereof. Likewise, the particular naming and division of the portions, modules, agents, managers, components, functions, procedures, actions, layers; features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A machine implemented method for extending user account control to groups, the method comprising the steps of:
   categorizing events managed under user account control, as said events occur;
   determining that at least one categorized event comprises an event to be managed across multiple occurrences;
   searching for stored resolutions only for the at least one categorized event determined to be managed across multiple occurrences;
   for the at least one categorized event determined to be managed across multiple occurrences, responsive to not finding a stored resolution, identifying at least one group the user manages and displaying a first dialog prompting a user to indicate whether to allow the at least one categorized event determined to be managed across multiple occurrences for an individual user and whether to allow the at least one categorized event determined to be managed across multiple occurrences for the at least one identified group;
   wherein the at least one identified group is selected from a list of groups consisting of:
   a plurality of users of a single computer;
   a plurality of users of a plurality of computers; and
   a plurality of computers operated by a single user;
   responsive to the first dialog, receiving a first user entered indication concerning processing the at least one categorized event determined to be managed across multiple occurrences;
   and storing the first user entered indication and identifying information concerning the at least one categorized event determined to be managed across multiple occurrences, as a resolution for the at least one categorized event determined to be managed across multiple occurrences.

2. The method of claim 1 further comprising: for the at least one categorized event, responsive to finding the stored resolution, applying the stored resolution without prompting any user for additional input.

3. The method of claim 1 further comprising:
   wherein for the at least one categorized event determined to be managed across multiple occurrences, responsive to finding a stored resolution, displaying a second dialog prompting a user to indicate whether to allow the at least one categorized event determined to be managed across multiple occurrences for the individual user and whether to allow the at least one categorized event determined to be managed across multiple occurrences for the at least one group, with the user entered indication from the stored resolution selected as a default option;
   responsive to the second dialog, receiving a second user entered indication concerning processing the at least one categorized event determined to be managed across multiple occurrences;
   and storing the second user entered indication and identifying information concerning the at least one categorized event determined to be managed across multiple occurrences, as a resolution for the at least one categorized event determined to be managed across multiple occurrences.

4. The method of claim 1 wherein user account control further comprises: the User Account Control component of Windows Vista.

5. A non-transitory computer readable medium containing a computer program product for extending user account control to groups, the computer program product comprising:
   program code for categorizing events managed under user account control, as said events occur;
   program code for determining that at least one categorized event comprises an event to be managed across multiple occurrences;
   program code for searching for stored resolutions only for the at least one categorized event determined to be managed across multiple occurrences;
   program code for, for the at least one categorized event determined to be managed across multiple occurrences, responsive to not finding a stored resolution, identifying at least one group the user manages and displaying a first dialog prompting a user to indicate whether to allow the at least one categorized event determined to be managed across multiple occurrences for an individual user and whether to allow the at least one categorized event determined to be managed across multiple occurrences for the at least one identified group;
   wherein the at least one identified group is selected from a list of groups consisting of:
   a plurality of users of a single computer;
   a plurality of users of a plurality of computers;
   and a plurality of computers operated by a single user;
   program code for, responsive to the first dialog, receiving a first user entered indication concerning processing the at least one categorized event determined to be managed across multiple occurrences;
   and program code for storing the first user entered indication and identifying information concerning the at least one categorized event determined to be managed across multiple occurrences, as a resolution for the at least one categorized event determined to be managed across multiple occurrences.

6. The non-transitory computer readable medium of claim 5 further comprising: program code for, for the at least one categorized event, responsive to finding a stored resolution, applying the stored resolution without prompting any user for additional input.

7. The non-transitory computer readable medium of claim 5 further comprising: program code for, for the at least one categorized event determined to be managed across multiple occurrences, responsive to finding a stored resolution, displaying a second dialog prompting a user to indicate whether to allow the at least one categorized event determined to be managed across multiple occurrences for the individual user and whether to allow the at least one categorized event determined to be managed across multiple occurrences for the at least one group, with the user entered indication from the stored resolution selected as a default option;

program code for, responsive to the second dialog, receiving a second user entered indication concerning processing the at least one categorized event determined to be managed across multiple occurrences;

and program code for storing the second user entered indication and identifying information concerning the at least one categorized event determined to be managed across multiple occurrences, as a resolution for the at least one categorized event determined to be managed across multiple occurrences.

8. The non-transitory computer readable medium of claim 5 wherein user account control further comprises: the User Account Control component of Windows Vista.

9. A computer system for extending user account control to groups, the computer system comprising:

means for categorizing events by a processor managed under user account control, as said events occur;

means for determining that at least one categorized event comprises an event to be managed across multiple occurrences;

means for searching for stored resolutions only for the at least one categorized event determined to be managed across multiple occurrences;

means for, for the at least one categorized event determined to be managed across multiple occurrences, responsive to not finding a stored resolution, identifying at least one group the user manages and displaying a first dialog prompting a user to indicate whether to allow the at least one categorized event determined to be managed across multiple occurrences for an individual user and whether to allow the at least one categorized event determined to be managed across multiple occurrences for the at least one identified group wherein the at least one identified group is selected from a list of groups consisting of:

a plurality of users of a single computer;

a plurality of users of a plurality of computers;

and a plurality of computers operated by a single user;

means for, responsive to the first dialog, receiving a first user entered indication concerning processing the at least one categorized event determined to be managed across multiple occurrences;

and means for storing the first user entered indication and identifying information concerning the at least one categorized event determined to be managed across multiple occurrences, as a resolution for the at least one categorized event determined to be managed across multiple occurrences.

10. The computer system of claim 9 further comprising: means for, for the at least one categorized event, responsive to finding a stored resolution, applying the stored resolution without prompting any user for additional input.

11. The computer system of claim 9 further comprising:

means for, wherein for the at least one categorized event determined to be managed across multiple occurrences, responsive to finding a stored resolution, displaying a second dialog prompting a user to indicate whether to allow the at least one categorized event determined to be managed across multiple occurrences for the individual user and whether to allow the at least one categorized event determined to be managed across multiple occurrences for the at least one group, with the first user entered indication from the stored resolution selected as a default option;

means for, responsive to the second dialog, receiving a second user entered indication concerning processing the at least one categorized event;

and means for storing the second user entered indication and identifying information concerning the at least one categorized event determined to be managed across multiple occurrences, as a resolution for the at least one categorized event determined to be managed across multiple occurrences.

12. The computer system of claim 9 wherein user account control further comprises: the User Account Control component of Windows Vista.

\* \* \* \* \*